United States Patent
Minikey, Jr. et al.

(10) Patent No.: US 9,434,313 B2
(45) Date of Patent: Sep. 6, 2016

(54) LOW PROFILE OPTICAL LIGHTING ASSEMBLY FOR USE IN OUTSIDE VEHICLE MIRROR AND METHOD OF FORMING SAME

(75) Inventors: Danny L. Minikey, Jr., Fenwick, MI (US); Frederick T. Bauer, Holland, MI (US); Michael G. Hendricks, Wyoming, MI (US); Michael F. Lisowski, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 187 days.

(21) Appl. No.: 13/396,156

(22) Filed: Feb. 14, 2012

(65) Prior Publication Data

US 2012/0206930 A1     Aug. 16, 2012

Related U.S. Application Data

(60) Provisional application No. 61/442,639, filed on Feb. 14, 2011.

(51) Int. Cl.
| | |
|---|---|
| *B60Q 1/26* | (2006.01) |
| *B60R 1/12* | (2006.01) |
| *B60R 1/06* | (2006.01) |
| *B60Q 3/02* | (2006.01) |

(52) U.S. Cl.
CPC ............ *B60R 1/12* (2013.01); *B60Q 1/2665* (2013.01); *B60R 1/0602* (2013.01); *B60Q 3/023* (2013.01); *B60R 2001/1215* (2013.01)

(58) Field of Classification Search
CPC ...... B60Q 1/2665; B60Q 3/023; B60R 1/02; B60R 1/1207
USPC .......... 362/23.01, 23.07, 23.12, 23.13, 23.2, 362/487, 494, 509, 511, 540–542, 559, 362/560; 340/463–467, 475
See application file for complete search history.

(56) References Cited

U.S. PATENT DOCUMENTS

| | | |
|---|---|---|
| 6,005,724 A | 12/1999 | Todd |
| 6,076,948 A | 6/2000 | Bukosky et al. |
| 6,257,746 B1 | 7/2001 | Todd et al. |
| 6,356,376 B1 * | 3/2002 | Tonar et al. .................. 359/267 |
| 6,657,767 B2 | 12/2003 | Bonardi et al. |
| 6,749,325 B2 | 6/2004 | Bukosky et al. |

(Continued)

FOREIGN PATENT DOCUMENTS

DE         19808393 A1    9/1999

OTHER PUBLICATIONS

Patent Cooperation Treaty, International Searching Authority, International Search Report, Written Opinion of the International Searching Authority and Notification of Transmittal, Oct. 29, 2012, 8 Pages.

*Primary Examiner* — Peggy Neils
*Assistant Examiner* — Alexander Garlen
(74) *Attorney, Agent, or Firm* — Price Heneveld LLP; Scott P. Ryan (57) ABSTRACT

An optical lighting assembly for use with a vehicular outside rearview mirror includes a printed circuit board (PCB) having a light source such as a light emitting diode (LED) mounted thereon. An optical device such as a light pipe is positioned adjacent to the LED for propagating light away from the LED. A mirror element includes at least one indicia where light escaping from the light pipe is used to illuminate the indicia.

26 Claims, 5 Drawing Sheets

(56) References Cited

U.S. PATENT DOCUMENTS

| | | |
|---|---|---|
| 6,918,685 B2 | 7/2005 | Bukosky et al. |
| 7,008,091 B2 | 3/2006 | Mathleu et al. |
| 7,083,313 B2 * | 8/2006 | Smith .......................... 362/555 |
| 7,104,676 B2 | 9/2006 | Bukosky et al. |
| 7,192,172 B1 | 3/2007 | Alberti |
| 7,221,363 B2 | 5/2007 | Roberts et al. |
| 7,241,037 B2 * | 7/2007 | Mathieu et al. ............. 362/494 |
| 7,273,307 B2 * | 9/2007 | Mathieu ........................ 362/540 |
| 7,306,355 B2 * | 12/2007 | Walser et al. ................ 362/494 |
| 7,327,321 B2 | 2/2008 | Todd et al. |
| 7,342,707 B2 * | 3/2008 | Roberts et al. ............... 359/267 |
| 7,416,318 B2 | 8/2008 | Mathieu |
| 7,452,113 B2 * | 11/2008 | Newton et al. ............... 362/494 |
| 7,954,985 B2 * | 6/2011 | Bisnack ........................ 362/494 |
| 8,058,977 B2 | 11/2011 | Lynam |
| 8,169,307 B2 | 5/2012 | Nakamura et al. |
| 2012/0099335 A1 | 4/2012 | Boehland |

* cited by examiner

LOW PROFILE OPTICAL LIGHTING ASSEMBLY FOR USE IN OUTSIDE VEHICLE MIRROR AND METHOD OF FORMING SAME

CROSS-REFERENCE TO RELATED APPLICATION

This application claims the benefit of and priority to U.S. Provisional Patent Application No. 61/442,639, filed on Feb. 14, 2011, entitled "LOW PROFILE OPTICAL LIGHTING ASSEMBLY FOR USE IN OUTSIDE VEHICLE MIRROR AND METHOD OF FORMING SAME," the disclosure of which is hereby incorporated herein by reference in its entirety.

FIELD OF THE INVENTION

The present invention relates generally to optical displays and more specifically a low profile optical assembly for use in lighting indicia used with an outside vehicle mirror.

BACKGROUND OF THE INVENTION

Outside mirrors having indicia for signaling turns or alerting a driver to vehicles in the driver's blind spot are well known in the art. Side blind zone alert (SBZA) systems often use an icon that appears in the vehicle's side mirror when the system detects a vehicle or other objects in the driver's blind spot. In use, the SBZA enables the vehicle to detect other vehicles located where they may be difficult for the driver to directly see using the outside mirrors.

Figure 1A:
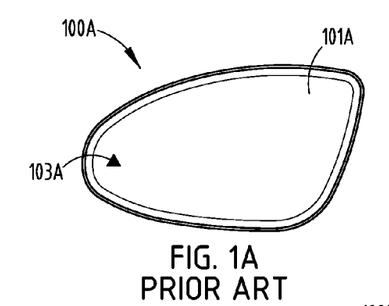
FIGS. 1A, 1B and 1C are prior art diagrams showing various forms of indicia used with an outside vehicular mirror.
Figure 1B:
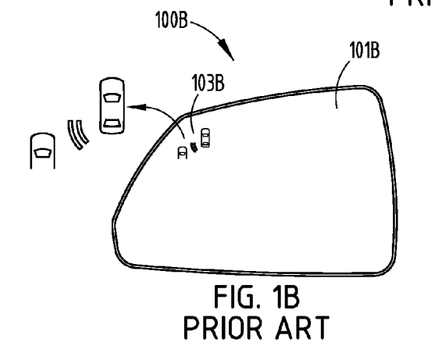
Figure 1C:
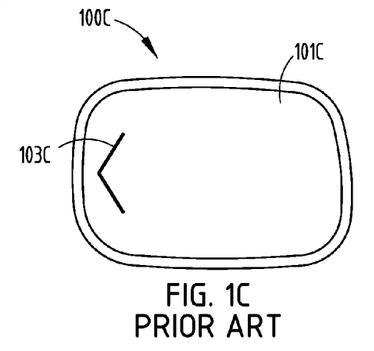

When the SBZA system detects a vehicle in the adjacent lane, the system will illuminate a symbol or other indicia on the driver's outside rearview mirror. This alerts the driver to a potential collision. Often, when the driver activates the turn signal in the direction of the detected vehicle, the blind spot alert symbol will flash to better draw the attention of the driver. Otherwise, the symbol remains illuminated until the other vehicle has left the blind zone. Prior art FIG. 1A, FIG. 1B and FIG. 1C illustrate various types of indicia that are often used with the outside rearview mirror. FIG. 1A illustrates a mirror assembly 100A that uses a triangular symbol 103A positioned at a side edge of mirror 101A. The triangular indicia 103A is commonly used with the SBZA for indicating a detected vehicle in the vehicle's blind spot zone.

Similarly, FIG. 1B illustrates a mirror assembly 100B that shows vehicle indicia 103B that depicts two offset vehicles such that one vehicle is to the left and behind the driver's vehicle in the blind spot zone. The vehicle indicia 103B is also positioned on a side of the mirror 101B and is also used in connection with an SBZA. Finally, FIG. 1C is another mirror assembly 100C that is used as a turn signal indicator such as the chevron 103C that is positioned at an edge of the mirror 101C. When used in this type of application, the chevron 103C would be used with the driver's outside mirror showing the indicia depicting a turn to the left while blinking or illuminated. These indicia or other symbols are most often cut or etched into the mirror glass however indicia formed using microdots and associated applica are also possible. When activated, light projected behind the mirror element will illuminate the symbol or indicia such that it is visible for altering the driver.

Various lighting packages have been developed in order to provide illumination to the indicia behind the mirror glass. The illumination allows the indicia to be easily detected by the driver in both daylight and darkness. Since the outside mirror housing must be limited to a certain size, the optics for lighting the symbols and other indicia become very important since they must radiate a bright light while still remaining a relatively small size in order to fit within a predefined space.

Figure 2:
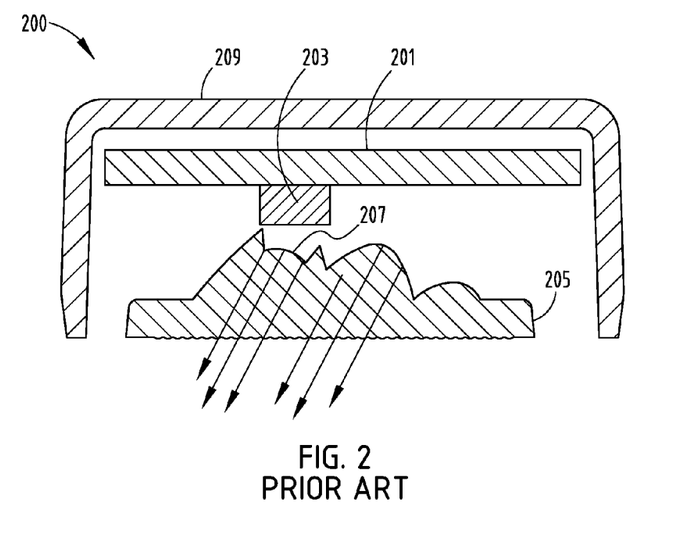
FIG. 2 is a prior art diagram showing a cross-sectional view of a lighting module using lens optics.

FIG. 2 is a prior art cross-sectional diagram showing a lighting technique as used in the prior art. The optical module 200 includes a printed circuit board (PCB) 201 having a light emitting diode 203 mounted on one side of the PCB. An optical device 205 is positioned in front of the LED 203 and is used for gathering and directing light rays at a specific angle towards the indicia. This allows the indicia to be visible to the user. In order to protect the optics within the optical module, a cover 209 is used to surround the back portion of the module.

The optic device 205 comprises a first lens surface having a total internal reflector (TIR) portion surrounding a refractive portion and a macro beam shaping device. Rather than incorporating lenses into the design, TIR optical materials are used for obtaining a desired illumination pattern from the LEDs or other illumination devices. TIR optical material is advantageous since it can be manufactured of plastic of a reduced size and weight. Moreover, the TIR material can encompass an entire light source for reducing and/or eliminating optical loss that would occur with an optical lens. As seen in FIG. 2, the TIR optic 205 uses surfaces of revolution based on free-form curves such as a light collection cup 207. The TIR optic 205 also uses other optical principles such cubic splines or Bézier curves that operate to steer and/or direct light in a desired direction.

Those skilled in the art will recognize that other embodiments may use an eccentric reflector to reflect the maximum amount of light from the light source toward the indicia. An eccentric reflector is a reflector that reflects light at a point which is not at a focal point of the reflector optic. However, a disadvantage of these types of lighting assemblies is that the use of eccentric reflectors and other optical devices increase the overall thickness of the lighting module. Although thin profile designs can be achieved using both LED backlighting techniques and eccentric reflectors, current design parameters often require a depth or thickness less than 9 mm. Accordingly, designs using an eccentric reflector can be limited to applications where these types of design constraints are not an issue and the mirror can accommodate the large size of this type of lighting assembly.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE PREFERRED EMBODIMENTS

Before describing in detail embodiments that are in accordance with the present invention, it should be observed that the embodiments reside primarily in combinations of method steps and apparatus components related to a low profile optical assembly for use with an outside vehicular mirror. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Figure 3:
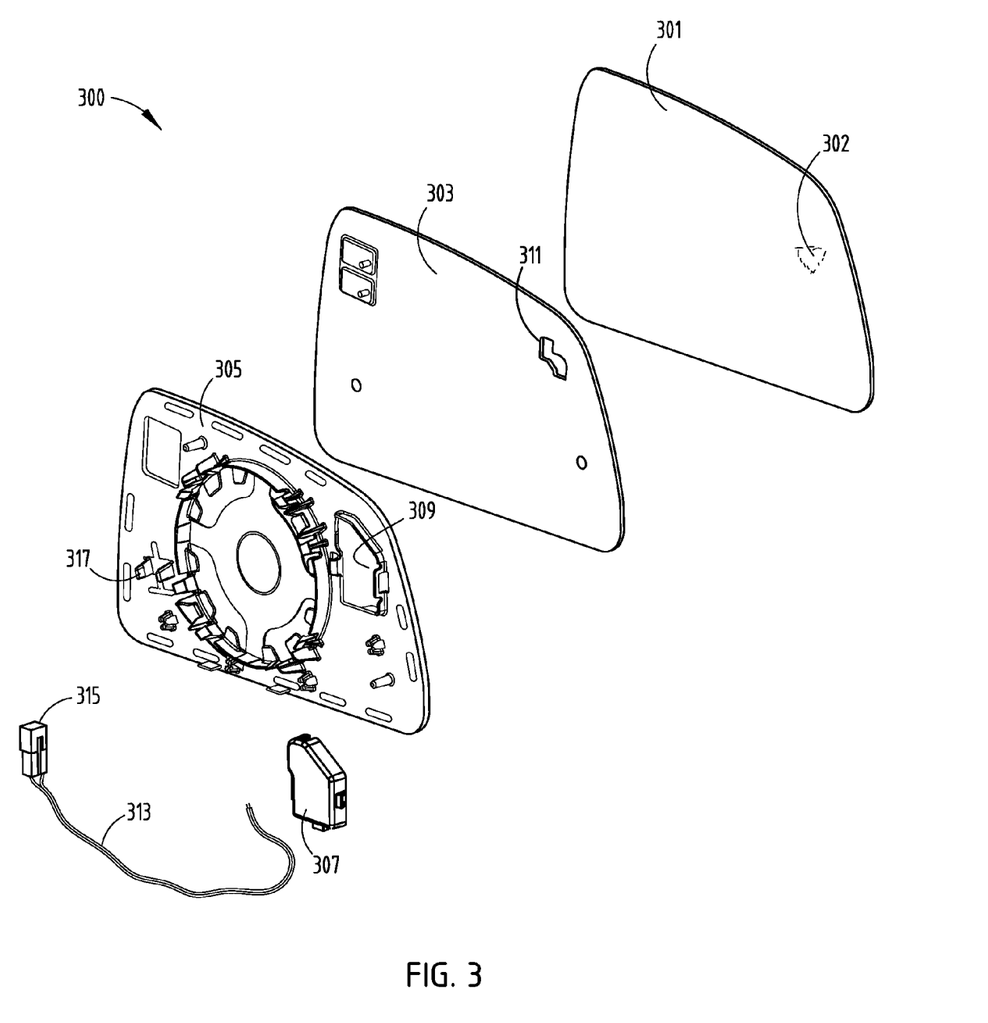
FIG. 3 is an exploded view of an outside vehicular mirror assembly showing the various elements that are positioned within the mirror housing according to an embodiment of the invention.

FIG. 3 is an exploded view of an outside vehicular mirror assembly showing the various elements that are positioned within a mirror housing. The mirror assembly 300 includes a reflective mirror element 301 that may be manufactured of mirrored glass having a fixed reflectance or alternatively an electrochromic (EC) element for varying the reflectance of the mirror. Positioned behind the mirror element 301 is a heating element 303 used for melting ice and/or evaporating condensation or other fluids from the front surface of the mirror element 301. A carrier plate 305 is positioned behind the heating element 303 and is used for holding the mirror 301 and heater 303 into a rigid and fixed position within a mirror housing. As will be described in further detail herein, a lighting module 307 is used for providing the lighting for illuminating various indicia 302 cut and/or etched into a surface of the mirror element 301. The indicia are used typically for driver assist functions of the vehicle including but not limited to turn signals, blind spot detection, obstacle detection, lane departure warning (LDW) or the like.

The lighting module 307 fits within a walled holder 309 that is formed within the carrier assembly 305. The holder 309 is used for holding the lighting module 307 into a fixed position. In use, the light module 307 is oriented so as to allow light rays to propagate in forward direction through an aperture 311 in the heating element 303. The light is then projected through the indicia 302 allowing the etched glass to have a brightly illuminated glow for viewing by the driver. The illumination is of the nature to draw the driver's attention to the indicia when a fully lit of blinking state. The lighting module 307 is powered using a wiring harness 313 and electrical connector 315 at vehicle voltages of 12 VDC or less. The electrical connecter 315 can be used with carrier recess 317 for holding the electrical connector 315 into a fixed position.

Figure 4:
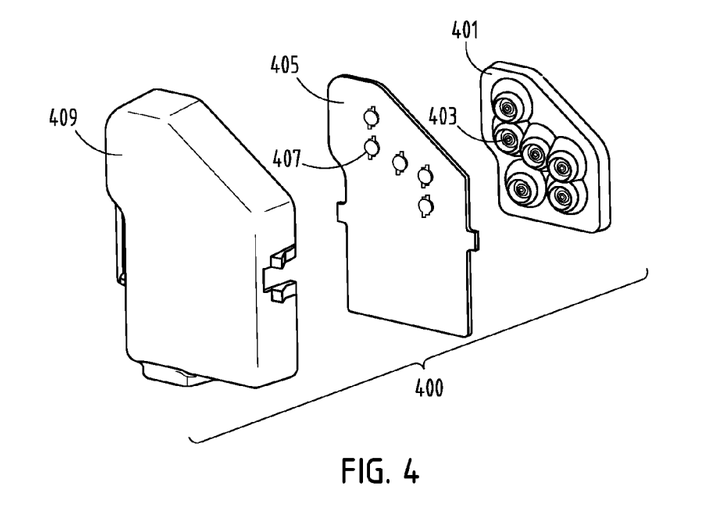
FIG. 4 is an exploded view of the element with the lighting module showing in FIG. 3.

FIG. 4 is an exploded view of an embodiment of the lighting module shown in FIG. 3. The light module 400 includes an optical device 401 such as lens optic. As described herein, the lens optic contains a first lens surface having a total internal reflector (TIR) portion surrounding a refractive portion. The lens optic also includes a macro beam shaping device configured to obtain both a desired illumination pattern and indicia luminance from the illumination devices positioned behind the optic. The lens optic 401 has one or more surfaces of revolution 403 for directing the light in a predetermined pattern and/or direction. A printed circuit (PC) board 405 is positioned behind the optical device and includes one or more illumination devices 407 such as LEDs or the like. The LEDs may be clear, colored, multi-colored and/or mixed in various combinations of color to illuminate the indicia to a published standard or achieve some desired illumination effect.

The illumination devices such as LEDs 407 are mounted on the surface of the PC board opposite that which projects toward the optical device 401. By having the LEDs back-mouted on the PC board 405, the LEDS are inset in the PC board 405 in order to save overall space. This configuration reduces the overall thickness of the PCB assembly, i.e., the thickness of the PCB and the components mounted thereto rather than the LED mounted on one side of the PCB with no through hole. Thus, the overall width or profile of the PC board 405 and the illumination device 407 is thinner than if the illumination device 407 were mounted on the front surface of the PC board 405 (e.g. the surface facing the optical device 401). The LEDs may be mounted in a predetermined shape or pattern on the PC board 405 in order to align one or more of the LEDs with an optical device 401 for providing the maximum amount of light at specific locations to the optical device 401. In order to achieve the desired illumination of the indicia, an LED may be axially aligned with the optical device 401 or offset in a manner so as only the desired amount of light is propagated to the optical device. Although illustrated as one type of optical device 401, it will be evident to those skilled in the art, various types of optics can be used in order to achieve a desired effect. The light module 400 further includes a cover 409 for preventing dirt or other debris from contacting the illumination devices 407 or the optical device 401. The cover 409 has a predetermined shape and attachment mechanism so as to fit within the walled holder or other predetermined area of the carrier plate as seen in FIG. 5.

Figure 5:
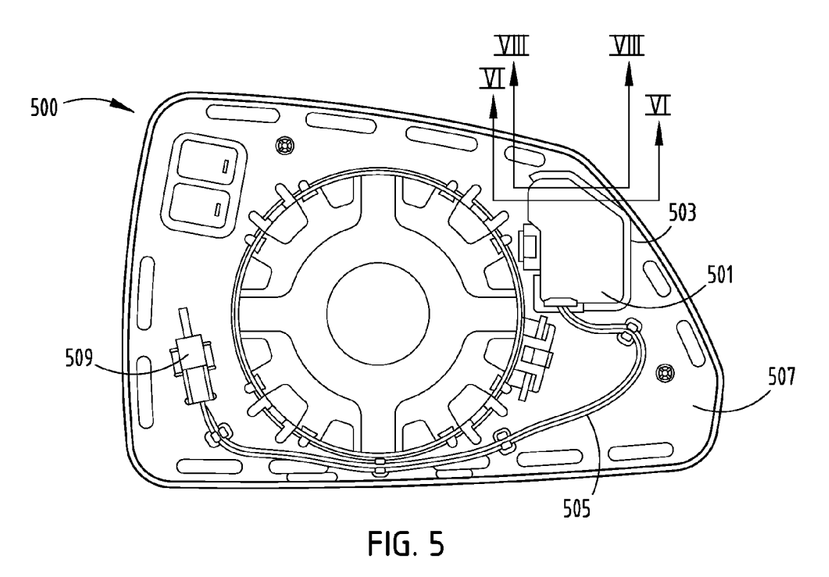
FIG. 5 is a plan view of the carrier plate assembly as shown in FIG. 3 with the light module mounted in the carrier plate assembly.

FIG. 5 illustrates a front view of the carrier assembly as seen in FIG. 3. The carrier assembly 500 includes the lighting module 501 shown mounted in the holder 503. The wiring harness 505 is shown extending along the lower edge of the carrier plate 507. The electrical connector 509 may mate to a corresponding receptacle in the carrier assembly 500 for providing power to the lighting module 501. The carrier assembly as described herein can be used for various types of light modules such as the thru-board and edge lighting embodiments as described herein.

Figure 6:
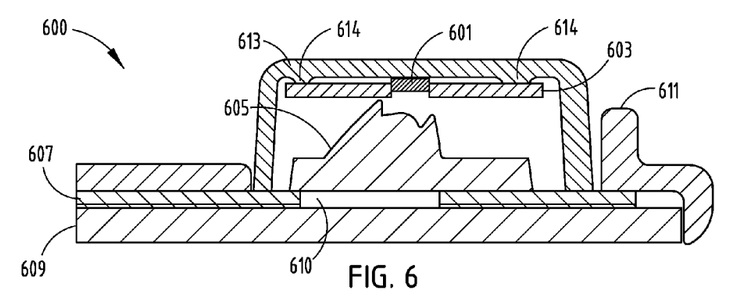
FIG. 6 is a side cross sectional view of a thru-board lighting module viewed through section lines VI-VI of FIG. 5 according to an embodiment of the invention.

FIG. 6 is a side cross-sectional view of the thru-board lighting module shown through section lines VI-VI of FIG. 5 according to an embodiment of the invention. The light module 600 is arranged to include one or more illumination devices 601 mounted (e.g. LEDs) to the rear side of the PCB 603. Although a design incorporating five (5) LEDs is illustrated in FIG. 4, it will be evident to those skilled in the art that other designs greater than or less than five LEDs are also possible for providing desired amounts of light unique to a specific application. Alternatively, other styles of LEDs that are smaller can also be used to provide a desired amount of light needed for this lighting application.

The PCB 603 defines a gap, aperture or hole allowing light from the LED to project in a forward direction into and through the hole. As described herein, the light from the LED 601 is collected by an optical device 605 such as a TIR optic or the like for obtaining a desired illumination pattern from the LED 601. The optical device 605 is positioned such that it touches or abuts a portion of a rear surface of the heating element 607. The mirror glass 609 is then positioned upon a front surface of the heating element 607. This allows light from the optical device 605 to propagate through an aperture 610 of the heater 607 toward the mirror glass 609. This light is then used to illuminate indicia providing driver assist functionality which are cut or etched into the mirror glass 609. An edge of the carrier substrate 611 can frictionally engage an adhesive with both the heater 607 and the mirror glass 609 for holding the assembly into a fixed position within the housing.

As described herein, a cover 613 is used to prevent dust and other debris from entering the light module that might taint the color of light or lessen the light intensity that would be available to illuminate the indicia at the mirror glass 609. As can be seen by comparing FIG. 2 and FIG. 6, the PCB 603 and components connected thereto (e.g. illumination device 601) of FIG. 6 can be thinner having a lesser profile then the PCB 201 and the LED 203 of prior art FIG. 2. This is based up on the illumination device 601 being inset to the PCB 603 and electrically connected to the backside of the PCB 603 rather than a front side of the PCB. A projection 614 or spacer is shown in FIG. 6 extending from the cover portion 613 to the PCB 603.

Figure 7:
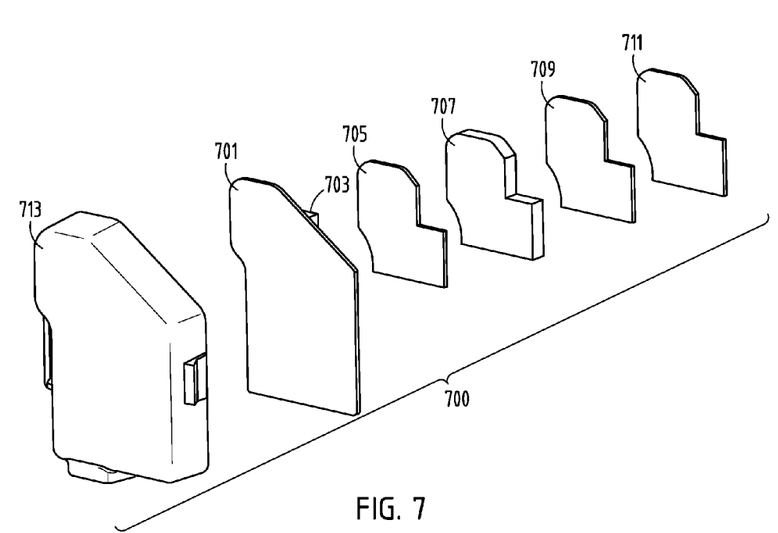
FIG. 7 illustrates an exploded view of and edge-lit light module assembly in accordance with an alternative embodiment of the invention.

FIG. 7 illustrates an exploded view of an edge-lit light module assembly in accordance with an alternative embodiment of the invention. The light module assembly 700 includes a printed circuit board 701 having one or more illumination devices 703 (e.g. LEDs) mounted thereon for providing a light source. An optical enhanced specular reflector (ESR) film 705 is positioned adjacent to the LEDs 703 for guiding light from the LEDs 703 into an optical device 707. As described herein, optical device 707 is a light guide, light pipe or the like and is used for propagating light to various locations from the illumination devices 703. An optical diffuser 709 is positioned adjacent to and in front of the optical device 707. The optical diffuser 709 works to spread or scatter the light in a forward direction toward the mirror glass. It should be evident to those skilled in the art that many different varieties of diffusers might be used for this application including but not limited to ground glass diffusers, Teflon diffusers, holographic diffusers, polymer diffusers opal glass diffusers and greyed glass diffusers. Finally, an optical brightness enhancement film (BEF) is used in front of the diffuser 707. The BEF operates to direct all of the light rays in a single forward direction for effectively increasing the brightness of the light module assembly 700 as light is projected toward the indicia. An additional BEF film orientated 90 degrees to the first film can optionally be used to further enhance the intensity. Finally as noted herein, a cover 713 is used at the rear of the edge-lit light module 700 for preventing dust and other debris from entering the assembly and affecting operation of the optics.

Figure 8:
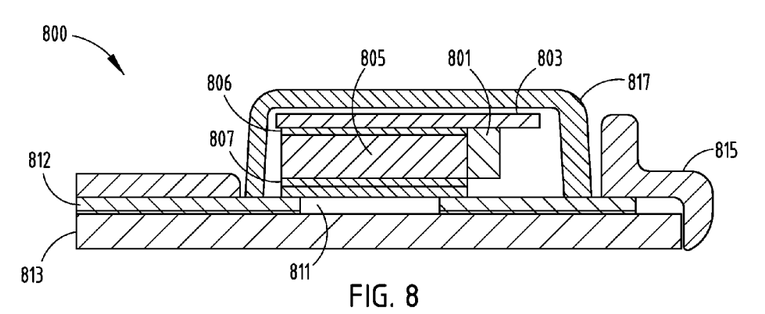
FIG. 8 is a cross-sectional view of the edge-lit light module assembly viewed through lines VIII-VIII of FIG. 5.

FIG. 8 is a cross-sectional view of the edge lighting module assembly taken through lines VIII-VIII of FIG. 5. The edge lit light module 800 includes an illumination device 801 such as one or more LEDs used to form a light source. The light illumination device 801 is mounted to a PCB 803 such that the LED 801 extends outwardly to abut one side edge of an optical device 805. The optical device 805 may be a light tube, light pipe, light guide, fiber optic or the like that includes a textured surface for allowing light from the LED 801 to propagate over some predetermined distance using only a single light source. For this edge-lit application, the optical device 805 is a light pipe having a textured surface for diffusing light where the light pipe is formed using a planar element such as transparent plate for distributing light over its entire length. In this lighting application, it is desirous to select a light pipe for the controlled leakage of light allowing the light to propagate in the optical device. The illumination device 801 as used in combination with the light pipe 805 provides a substantially low profile since the light source generally is positioned adjacent the optical device 805 such that the overall depth of both of these elements can be kept to less than 9 mm. According to one embodiment, the overall depth can be in a range between approximately 4 mm and 8 mm. This offers a distinct advantage over prior art designs since the edge light module assembly can be used in situations where limited space is available for the lighting source.

In use, the light escaping optical device 805 will be reflected by reflective surface 806 which could be but is not limited to a white reflective plastic, a metalized plastic or an optical ESR film. The reflective surface 806 allows an optimal amount of light to be reflected in a forward direction so as it passes through an optical diffuser 807. As described herein, the diffuser spreads the light rays so as they are directed through an optional BEF film in one direction for enhancing the overall brightness of the edge lit module 800. Those skilled in the art will also recognize that a second BFF film may also be used for directing light in a different plane. The light then passes through an aperture 811 formed within the heater element 812. The light escaping through the aperture 811 can then be used for illuminating one or more indicia that is etched into the mirror glass 813. As described herein, the carrier plate 815 is used for holding the heater 812 and mirror glass element 813 into a fixed positioned while mounted in the mirror housing. A cover 817 works to cover the back of the light module 800 for preventing dust or other debris from entering the assembly that might adversely affect optical performance.

Figure 9A:
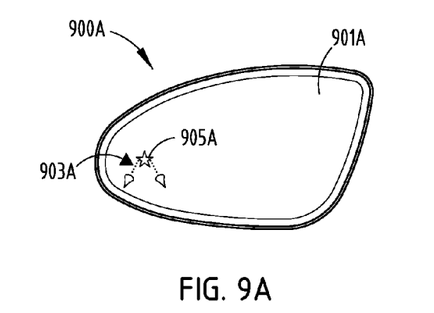
FIG. 9A, FIG. 9B and FIG. 9C are diagrams showing a form of indicia used in connection with embodiments of the present invention.
Figure 9B:
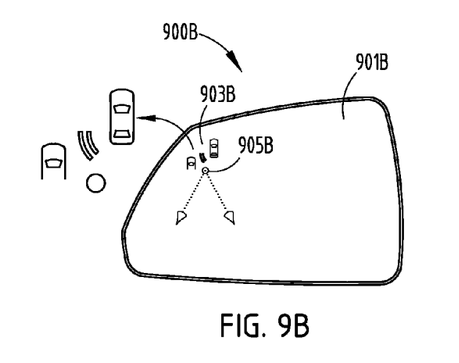
Figure 9C:
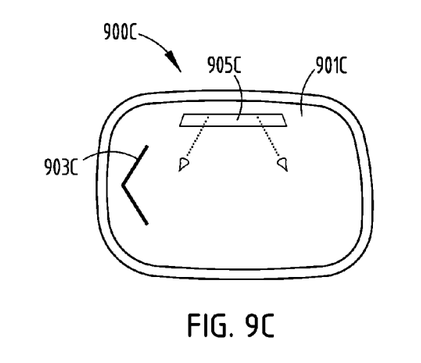

FIG. 9A, FIG. 9B and FIG. 9C are diagrams showing illuminated indicia and/or icons used in connection with the mirror glass that can indicate various vehicle functions and driver assist options according to various embodiments of the present invention. FIG. 9A illustrates an outside mirror 900a having a mirrored element 901a showing an icon that is used for indicating activation and/or annunciation of various driver assist features. A single icon or indicia may be shaped as a triangle 903A, star 905B or both may be used. Similarly, FIG. 9B illustrates an outside mirror 900B having a mirror 901B where a blind spot detector 903B, in the form of an automotive icon, is used for notifying the driver of activation of a blind spot detector for indicating e.g. the presence of a vehicle of other object in the driver's blind spot. A secondary enunciator 905B is used for indicating to the driver that some predetermined driver assist function may have failed a self-test mode or is having some other type of functional difficulty to alert the driver the device should not be relied upon due to malfunction. FIG. 9C is an outside mirror 900C having a mirrored element 901C showing both a turn signal 903C along with an annunciation bar 905C at the top portion of the mirror element 901C for indicating activation of a driver assist function.

Hence, one or more embodiments of the present invention are directed to an optical light module for illuminating symbols or other indicia etched into the reflective glass in an outside vehicular mirror. In one embodiment a thru-board light module is described where one or more light illumination devices such as LEDs are mounted on a rear surface of a PCB. The LEDs propagate light through an aperture located in the PCB where the light is directed to at least one TIR optic. This light is directed through an aperture in the heating element where it is then used to illuminate symbols, letters, numbers and/or other indicia etched into the mirror glass. Similarly, another embodiment of the invention uses an edge lit light technique where one or more illumination devices such as LEDs are positioned adjacent to an edge of an optical light pipe or the like. Light then propagates through the light pipe where it is reflected or refracted in a forward direction. The light then passes through an optical diffuser and an optical BEF. Once the light passes though an aperture in the heating element, it can be used to illuminate symbols or other indicia etched into the mirror glass. The invention is advantageous in that it can be manufactured at low cost and with a profile of less than 10 mm for mounting into small cavities inside an outside mirror housing.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued

We claim:

1. A low profile optical lighting assembly for use in an outside vehicular mirror comprising:
   at least one light source mounted to a first side of a printed circuit board (PCB) so as to project light through a gap in the PCB to a second side of the PCB, wherein the light source has a height extending from the first side;
   a lens optic device positioned on the second side of the PCB from the at least one light source and separated from the light source, wherein the lens optic device is configured to receive light from the light source and spread the light over an aperture larger than the gap, the aperture corresponding to at least one indicia;
   a mirror element arranged parallel to the PCB comprising the at least one indicia, wherein light passing through the lens optic device illuminates the at least one indicia, wherein the PCB and the mirror element are substantially parallel to provide for the low profile; and
   a cover member in direct contact with the first side of the PCB and forming a space approximately the height of the light source from the PCB.

2. A low profile optical lighting assembly as in claim 1, further comprising:
   a heating element positioned between the lens optic device and the mirror element such that light from the lens optic device passes through the aperture formed in the heating element for illuminating the at least one indicia.

3. A low profile optical lighting assembly as in claim 1, wherein the at least one indicia is at least one from the group of a triangular shape, a figure representing two adjacent vehicles and a turn signal chevron.

4. A low profile optical lighting assembly as in claim 1, wherein at least the at least one light source and the lens optic device have a depth in a range between approximately 4 mm to 9 mm.

5. A low profile optical lighting assembly as in claim 1, wherein the indicia includes a portion for indicating a result of a self-test, the result of the self-test indicating a malfunction in a driver assist function.

6. A low profile optical lighting assembly as in claim 1, wherein the lens optic device is positioned between two substantially parallel surfaces of the PCB and the mirror element.

7. A low profile optical lighting assembly as in claim 1, further comprising a heating element positioned between the lens optic device and the mirror element, wherein the cover element forms a cavity is in contact with the heating element.

8. A low profile optical lighting assembly as in claim 7, further comprising a spacer extending from an interior surface of the cover member to the first side of the PCB, wherein the spacer is configured to maintain the space between the cover member and the PCB.

9. A low profile optical lighting assembly for use in an outside vehicular mirror comprising:
   a light source disposed on a first side of a printed circuit board (PCB) for projecting light through a gap in the PCB;
   a lens optic device positioned adjacent to but spaced from the light source and positioned on a second side of the PCB from the light source;
   a mirror element having at least one indicia so that light passing through the lens optic device illuminates the at least one indicia;
   a heating element having an aperture disposed therein and positioned between the lens optic device and the mirror element, wherein the lens optic device is configured to receive the light from the gap and spread the light over a surface of the mirror element larger than the gap, and wherein the PCB and the mirror element are substantially parallel to provide for a thin profile of the low profile optical lighting assembly; and
   a cover member forming a cavity and in contact with the heating element, wherein the cover member houses the lens optic device, the PCB, and the light source, a spacer extending from the cover member and in direct contact with the first side.

10. A low profile optical lighting assembly as in claim 9, wherein the light source and the lens optic device have a depth in a range between approximately 4 mm to 9 mm.

11. A low profile optical lighting assembly as in claim 9, wherein the indicia includes a portion for indicating a result of a self-test.

12. A low profile optical lighting assembly as in claim 9, where the spacer is configured to maintain a space between the cover member and the PCB, the space corresponding to a height of the light source extending from the first side of the PCB.

13. An optical lighting assembly for use with a vehicular outside review mirror comprising:
   a printed circuit board (PCB) having at least one light source mounted thereon configured to emit light through a gap in the PCB, the at least one light source disposed on a first side of the PCB defining an emission direction substantially perpendicular to the PCB the light source having a height extending from the first side of the PCB;
   a lens optic device disposed proximate to a second side of the PCB and spaced from the light source, wherein the lens optic device is configured to receive the light from light source and spread the light over an aperture substantially larger than the gap, the aperture corresponding to at least one indicia;
   a mirror element extending substantially perpendicular to the emission direction and including at least one indicia;
   a heating element positioned between the lens optic device and the mirror element;
   a cover member abutting the heating element and forming a cavity configured to house the light source, the PCB, and the lens optic device, wherein the cover member comprises a spacer in direct contact with the first side of the PCB and configured to maintain the height between the cover member and the PCB; and
   wherein the light directed in the predetermined pattern from the lens optic device is used to illuminate the at least one indicia.

14. An optical lighting assembly as in claim 13, further comprising:
   an optical diffuser positioned between the lens optic device and the mirror element for diffusing light escaping from the lens optic device.

15. An optical lighting assembly as in claim 13, further comprising:
   an optical brightness enhancement film (BEF) operable to increase a brightness of light transmitted from the lens optic device, the optical BEF positioned between the lens optic device and the mirror element for directing light towards the indicia.

16. An optical lighting assembly as in claim 13, further comprising:
   a heating element having the aperture therein for allowing the light from the lens optic device to pass through the aperture to the mirror element.

17. A low profile optical lighting assembly as in claim 13, wherein the at least one indicia is at least one from the group of a triangular shape, a figure representing two adjacent vehicles and a turn signal chevron.

18. A low profile optical light assembly as in claim 13, wherein the PCB, the at least one light source, and the lens optic device have a depth in a range between approximately 2 mm and 6 mm.

19. A low profile optical lighting assembly as in claim 13, wherein the indicia includes a portion for indicting a result of a self-test.

20. A low profile optical lighting assembly as in claim 13, wherein the indicia is used for providing a driver assist function.

21. An optical lighting assembly for use with a vehicular outside rearview mirror comprising:
   a printed circuit board (PCB) having at least one light source mounted on a first side, the PCB configured to be disposed in a cover configured to connect to a carrier plate of the rearview mirror, the light source configured to emit light through a gap formed in the PCB;
   a lens optic device positioned proximate to a second side of the PCB and configured to spread the light from the light source over a surface larger than the gap;
   a mirror element extending substantially co-planar to the PCB including at least one indicia corresponding to the surface and illuminated from the lens optic device for signaling the driver of a driver assist function; and
   a cover member extending from proximate the mirror element and forming a cavity configured to house the PCB, the light source, and the lens optic device, the cover member forming a projection configured to directly contact the first side of the PCB and form a space for the at least one light source between the cover member and the PCB.

22. An optical lighting assembly as in claim 21, further comprising:
   an optical diffuser positioned between the lens optic device and mirror element for diffusing light escaping from the lens optic device.

23. An optical lighting assembly as in claim 21, further comprising:
   a heating element having at least one aperture therein for allowing light from the lens optic device to pass through the aperture to the mirror element.

24. A low profile optical lighting assembly as in claim 21, wherein the driver assist function includes at least one from the group of: blind spot indication or obstacle detection.

25. An optical lighting assembly as in claim 23, wherein the aperture is larger than the gap.

26. An optical lighting assembly as in claim 21, wherein a height of the light source extends from the first side and wherein the space formed by the projection provides for the height of the light source to extend between the cover member and the PCB.

* * * * *

UNITED STATES PATENT AND TRADEMARK OFFICE
CERTIFICATE OF CORRECTION

PATENT NO. : 9,434,313 B2  
APPLICATION NO. : 13/396156  
DATED : September 6, 2016  
INVENTOR(S) : Minikey, Jr. et al.

Page 1 of 1

It is certified that error appears in the above-identified patent and that said Letters Patent is hereby corrected as shown below:

In the Claims

Column 8, Claim 7, Line 37:
After "cavity" insert --and--;

Column 9, Claim 13, Line 18:
After "PCB" insert --,--;

Column 9, Claim 13, Line 23:
After "from" insert --the--;

Column 10, Claim 19, Line 10:
Delete "indicting" and insert --indicating--.

Signed and Sealed this
Sixteenth Day of May, 2017

Michelle K. Lee
*Director of the United States Patent and Trademark Office*